(12) United States Patent
Wright et al.

(10) Patent No.: US 7,103,381 B1
(45) Date of Patent: Sep. 5, 2006

(54) METHOD AND/OR APPARATUS FOR IMPLEMENTING USB AND AUDIO SIGNALS SHARED CONDUCTORS

(75) Inventors: David G. Wright, Escondido, CA (US); David Wooten, Escondido, CA (US)

(73) Assignee: Cypress Semiconductor Corp., San Jose, CA (US)

( * ) Notice: Subject to any disclaimer, the term of this patent is extended or adjusted under 35 U.S.C. 154(b) by 558 days.

(21) Appl. No.: 10/054,329

(22) Filed: Jan. 22, 2002

(51) Int. Cl.
*H04B 1/38* (2006.01)
*H04M 1/00* (2006.01)

(52) U.S. Cl. ............... 455/557; 455/556.1; 455/556.2; 455/558; 455/559; 710/63; 710/64

(58) Field of Classification Search ............... 455/557, 455/556.1, 556.2, 559; 710/63, 64
See application file for complete search history.

(56) References Cited

U.S. PATENT DOCUMENTS 6,408,351 B1 * 6/2002 Hamdi et al. ............. 710/63

6,678,535 B1 * 1/2004 Narayanaswami .......... 455/557
6,862,636 B1 * 3/2005 Young ....................... 710/69
2001/0021659 A1 * 9/2001 Okamura ................... 455/557
2003/0125082 A1 * 7/2003 Vanderhelm

OTHER PUBLICATIONS

Online publication, USB OTG, EVERYTHING USB.*
"SL811HS OTG Application Note", Cypress Semiconductor Corporation, Dec. 17, 2001, pp. 1-4.
"On-The-Go Supplement to the USB 2.0 Specification", Revision 1.0, Dec. 18, 2001, pp. 66.

* cited by examiner

*Primary Examiner*—Matthew Anderson
*Assistant Examiner*—Yuwen Pan (57) ABSTRACT

An apparatus comprising a transceiver circuit. The transceiver circuit comprises a plurality of bus input/outputs (I/Os). The transceiver circuit may be configured to directly couple (i) an analog signal to the bus I/Os when the bus I/Os are in a first state and (ii) a plurality of first digital signals to the bus I/Os when the bus I/Os are in a second state.

20 Claims, 5 Drawing Sheets

METHOD AND/OR APPARATUS FOR IMPLEMENTING USB AND AUDIO SIGNALS SHARED CONDUCTORS

FIELD OF THE INVENTION

The present invention relates to a method and/or architecture for implementing portable low power device interfaces generally and, more particularly, to a method and/or architecture for implementing cell phone handsets and other USB (or USB On-The-Go) devices to use a single 5-contact connector.

BACKGROUND OF THE INVENTION

Until recently, cellular telephone (cellphone) car kits (i.e., devices to mount a cellphone handset into a "nest" in a vehicle for hands-free user operation of the cellphone) were low volume products whose main users were "road warriors" and other business customers willing to pay several hundred dollars for such equipment. Recently however, some European countries and American states and localities have introduced legislation banning the use of cellphone handsets by drivers. As a result, the market for car kits has started to expand rapidly, and this trend is expected to continue. As car kits have moved into mass markets, the demand for a much lower cost solution is driving cellphone handset manufacturers to seek lower cost architectures. Simultaneously, the Universal Serial Bus (USB) protocol is becoming the standard interface on low-end cellphone handsets. The USB and/or USB On-The-Go protocol (the Universal Serial Bus 2.0 On-The-Go (USB OTG) Supplement, Revision 1.0, published December 2001 and hereby incorporated by reference in its entirety) is anticipated to be the primary data interface protocol for almost all cellphone handsets within a few years.

A typical cellphone handset with USB (or USB OTG) interconnecting capability has two connectors for interconnection to external devices. The two connectors are (i) a "jack plug" socket for attachment of an earpiece or other audio interface device to the cellphone and (ii) "sprung contact" type connector pads (or pins). The sprung contact connector is implemented for the USB interface (or port), battery charging to the cellphone handset battery, analog output to a cellphone car kit, etc. A typical cellphone handset that implements the USB OTG protocol includes a digital circuit (i.e., a baseband processor ASIC) that is configured to receive and present the digital portion of the cellphone signals and a physical layer interface (PHY) in an external IC that is configured to receive and present the analog portion of the cellphone signals.

The cost of a cellphone car kit is often more than the cost of the phone itself. The car kit incorporates a USB host that receives USB digital audio output packets, and converts the digital audio into analog form and plays the audio on the car kit loudspeaker(s). The car kit USB host also receives analog audio signals from the car kit microphone(s), converts the audio analog signals into digital form and transmits them over the USB bus to the cellphone handset.

A number of conventional solutions to reduce the cost and simplify the cellphone handset to car kit interconnection have been proposed. One proposed solution is to add two (i.e., mono in, mono out) or three (i.e., mono in, stereo out) pads/pins to the "sprung contact" connectors typically used by handset manufacturers to interface between the handset and the car kit. However, the implementation of additional connector pads/pins is unattractive because of the increased cost to the cellphone handset and the increased potential for unreliable contacts.

Another proposal is to add a jack plug connection to the car kit for interfacing to the audio socket on the handset. However, adding a jack to the car kit is unlikely to receive a favorable response from consumers who would like to be able to connect the handset to the car kit simply by placing the handset in the "nest" provided in the car kit. The added jack also has the potential for unreliable contacts.

Another proposal is to share the D+, D− and either the ID or the VBus pins found in the USB or USB OTG interface by capacitive coupling the audio signals within the cell phone to the USB or USB OTG signal pins. However, the disadvantages of capacitive coupling the audio signals within the cell phone to the USB or USB OTG signal pins include (i) the audio signals to be coupled to the USB pins must be switched elsewhere within the cellphone handset and (ii) having additional capacitance connected to the USB signaling pins is undesirable, even when the unconnected side of the capacitance is "floating". Additionally, the conventional proposals where external multiplexing is implemented do not provide a solution that is compliant with High Speed (HS) USB (i.e., 480 Mb/s) since the USB connection requires very tightly controlled characteristics on the D+ and D− signal conductors.

SUMMARY OF THE INVENTION

The present invention concerns an apparatus comprising a transceiver circuit. The transceiver circuit comprises a plurality of bus input/outputs (I/Os). The transceiver circuit may be configured to directly couple (i) an analog signal to the bus I/Os when the bus I/Os are in a first state and (ii) a plurality of first digital signals to the bus I/Os when the bus I/Os are in a second state.

The objects, features and advantages of the present invention include providing a method and/or architecture for implementing cellphone handsets and other USB (or USB On-The-Go) devices to use a single 4 (or 5)-contact connector that may (i) be implemented without additional cellphone handset and car kit connector pads/pins, (ii) implement standard connectors and protocols rather than proprietary connectors, (iii) be implemented without a separate headset jack connection, (iv) make all connections automatically and simultaneously without additional user intervention when the handset is mounted in the car kit "nest", (v) reduce parasitics and ensure better electrical properties for the analog and digital signals, (vi) be implemented without analog audio switching elsewhere within the device, (vii) directly connect the signals from the audio pins of the transceiver to the headset jack, (viii) significantly reduce cost and save space within the device, (ix) multiplex within the device such that the analog signals do not have to be "tri-stated", (x) be implemented without connection of any external components to the sensitive USB D+ and D− signal conductors, and/or (xi) support High Speed (HS) USB (e.g., 480 Mb/s) on the USB connection where the characteristics of the D+ and D− signal conductors are generally very tightly controlled.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
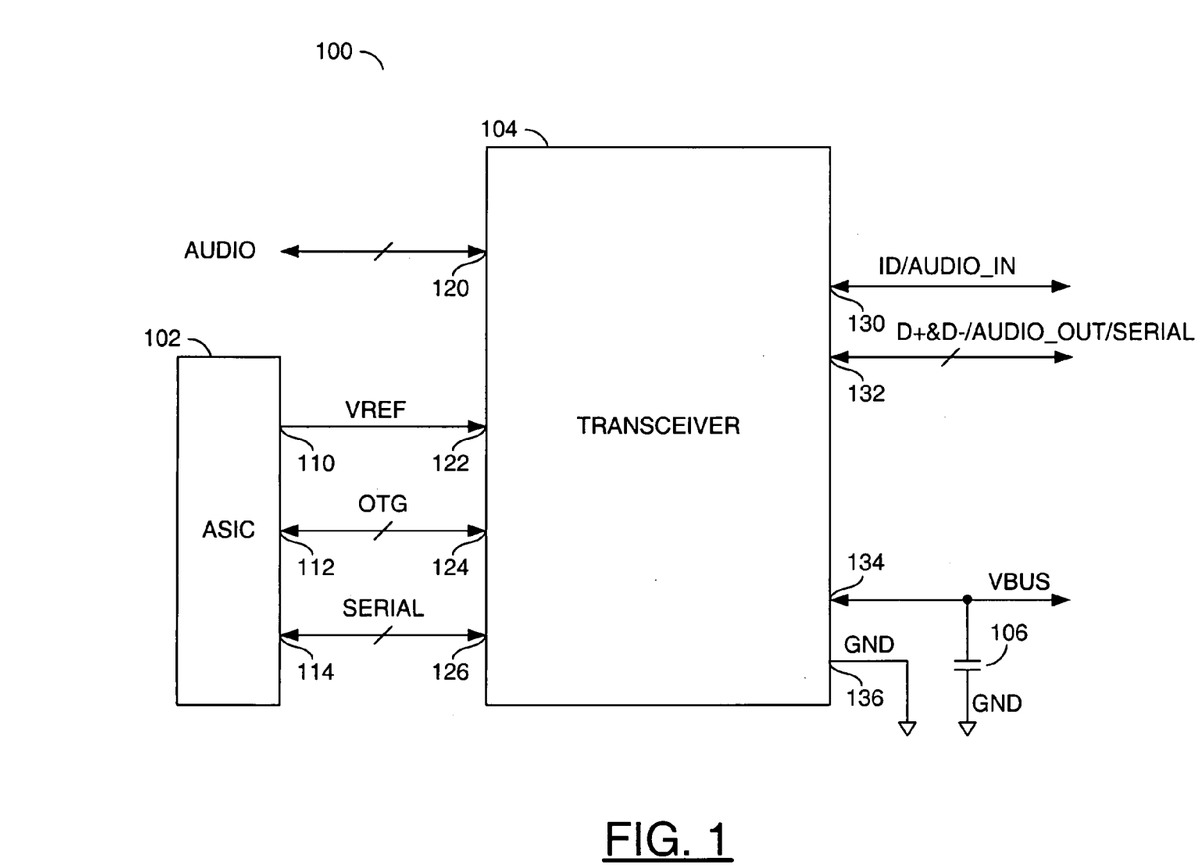
FIG. 1 is a block diagram of a preferred embodiment of the present invention.

Referring to FIG. 1, a block diagram of a circuit 100 is shown in accordance with a preferred embodiment of the present invention. The circuit 100 may be implemented as a transceiver circuit (or device). In one example, the circuit 100 may be implemented as an application specific integrated circuit (ASIC) and a transceiver circuit portion of a cellular telephone (cellphone) handset that is configured to provide interfacing between the cellphone and external devices such as car kits, microphones, headsets, cellphone battery chargers, Universal Serial Bus (USB) protocol devices, and/or USB On-The-Go (USB OTG) protocol devices. The circuit 100 may be particularly suited to a low-cost cellphone handset and car kit implementation for in-vehicle, hands-free cellphone operation. The cellphone handset may be mounted in the car kit "nest" (e.g., a receptacle or cradle configured to receive the handset). However, the circuit 100 may be implemented as any appropriate transceiver circuit (or device) where an analog signal and a digital signal (or a first digital signal and a second digital signal) may be alternately directly coupled from one device to another device via a single interconnect (e.g., a 4-conductor interconnect, a 5-conductor interconnect, and/or 4 conductors of any multi-conductor interconnect). The circuit 100 may be implemented such that USB (or USB OTG) and audio signals share conductors. The circuit 100 may provide for sharing four contacts of a single connection between USB or USB OTG signals and cellphone handset audio I/O signals.

The circuit 100 generally comprises a circuit 102, a circuit 104, and a circuit (or device) 106. The circuit 102 may be implemented as a broadband processor circuit. The circuit 102 may be implemented as an ASIC. The circuit 102 may be configured to present and receive a number of interface input/output (I/O) signals to the circuit 104. The circuit 104 may be implemented as a transceiver circuit. In one example, the circuit 104 may be implemented as a USB (or USB OTG) transceiver circuit. The circuit 104 may be configured to receive and present (i) an analog signal or signals (e.g., cellphone handset audio signals) and (ii) a number of the interface I/O signals presented to and received from the circuit 102. The circuit (or device) 106 may be implemented as a capacitance.

The circuit 102 may have an output 110 that may present a signal (e.g., VREF), an input/output 112 that may receive/present a signal (e.g., OTG), and an input/output 114 that may receive/present a signal (e.g., SERIAL). The signals VREF, OTG and SERIAL may be implemented as a plurality of interface I/O signals. The signal VREF may be a reference voltage. The signal OTG may be implemented as a multi-bit digital signal. In one example, the signal OTG may be implemented as a USB protocol signal. In another example, the signal OTG may be implemented as a USB OTG protocol signal. However, any appropriate signal type and/or protocol may be implemented accordingly to meet the design criteria of a particular application. The signal SERIAL may be implemented as a multi-bit digital signal. In one example, the signal SERIAL may be implemented as an Inter-IC ($I^2C$) protocol signal. In another example, the signal SERIAL may be implemented as a Serial Peripheral Interface (SPI) protocol signal. However, any appropriate signal type and/or protocol may be implemented accordingly to meet the design criteria of a particular application.

The circuit 104 may have an input/output 120 that may receive/present a signal (e.g., AUDIO), an input 122 that may receive the signal VREF, an input/output 124 that may receive/present the signal OTG, an input/output 126 that may receive/present the signal SERIAL, an input/output 130 that may receive/present a number of signals (e.g., ID and AUDIO_IN), an input/output 132 that may receive/present a number of signals (e.g., D+, D−, AUDIO_OUT, and SERIAL), an input/output 134 that may receive/present a signal (e.g., VBUS), and an output 136 that may present a signal (e.g., GND). The input/output 132 is generally a multi-conductor (e.g., two-conductor) input/output. The signals presented via the input/outputs 130 and 132 may be in response to a mode of operation of the circuit 100.

The circuit (or device) 106 may have a first terminal coupled to the input/output 134 (e.g., the first terminal may be configured to receive the signal VBUS) and a second terminal configured to receive the signal GND. The circuit 106 may represent the capacitance that is presented to the signal VBUS.

The signals ID, AUDIO_IN, AUDIO_OUT, D+, D−, and VBUS may be implemented as a plurality of interface signals. The signals ID, AUDIO_IN, AUDIO_OUT, D+, D−, and VBUS may be derived from the interface signals AUDIO, VREF, OTG and/or SERIAL. The signal AUDIO may be implemented as an analog signal. The signal AUDIO is generally implemented as an audio (e.g., a cellphone user voice) signal. The signal AUDIO is generally configured as a monaural (e.g., two conductor) or a stereo (e.g., three conductor) signal. However, the signal AUDIO may be implemented as any appropriate signal type and/or protocol to meet the design criteria of a particular application. The signal AUDIO_IN may be an audio signal received by the circuit 100. The signal AUDIO_OUT may be implemented as an audio signal presented by the circuit 100.

The signals ID, D+ and D− may be implemented as digital signals. In one example, the signal ID may be implemented as a USB OTG bus protocol device type identification signal. However, the signal ID may be implemented as any appropriate signal type and/or protocol to meet the design criteria of a particular application. The signals D+ and D− may be implemented as USB (or USB OTG) bus data signals. However, the signals D+ and D− may be implemented as any appropriate signal type and/or protocol to meet the design criteria of a particular application. The signal VBUS is generally implemented as the USB (or USB OTG) signal VBus (e.g., a signal compliant to the USB (or USB OTG) protocol VBus specification). The signal GND is generally implemented as the USB (or USB OTG) signal GND (e.g., an electrical ground).

The input/outputs 130, 132, 134, and 136 may be configured as an input/output (I/O) interconnect. In one example, the I/Os 130, 132, 134, and 136 may be implemented as a USB bus (or USB OTG bus) cellular telephone to a car kit interconnect. In one example, the bus I/Os 130, 132, 134, and 136 may be implemented as a 5-conductor/pin/pad interconnect. In another example, the bus I/Os 130, 132, 134, and 136 may be implemented as 5 conductors/ pins/pads of a multi-conductor interconnection. However, the interconnect formed by the I/Os 130, 132, 134, and 136 may be implemented as any appropriate interconnection to meet the design criteria of a particular application.

The circuit 100 is generally configured to determine (or detect) a state of one or more of the I/Os 130, 132 and/or 134 of the circuit 104. In one example, the circuit 102 may be configured to determine the state (or mode of operation) of one or more of the I/Os 130, 132, and/or 134. In another example, the circuit 104 may be configured to determine the state of one or more of the I/Os 130, 132, and/or 134. In either example, the state of the I/Os 130, 132, and/or 134 may be communicated between the circuits 102 and 104 via the signals OTG and/or SERIAL. The state determined via the circuit 100 is generally determines whether the I/Os 130, 132 and/or 134 are to be configured as (i) an analog (e.g., audio) connection (e.g., the I/Os 130, 132 and/or 134 comprise an audio interconnection), (ii) as a USB bus (or USB OTG) bus interconnection, or (iii) as another (e.g., non-USB or USB OTG) digital connection (e.g., I²C bus or SPI bus interconnection). In one example, the transceiver circuit 104 may be configured to detect (or determine) whether the connection between the circuit 100 and an external device (not shown) via the I/Os 130, 132 and/or 134 is an audio or a USB OTG connection via the USB OTG signal ID pin (e.g., the I/O 130).

In any case, the circuit 100 may be configured to automatically switch the interface between the circuit 100 and the external device (e.g., the bus I/O's 130, 132, and/or 134) to the appropriate type of interface (e.g., audio, USB (or USB OTG), or other digital) in response to the state of the interface I/Os 130, 132, and/or 134. An appropriate status (e.g., mode of operation) message may be transmitted/received via the serial interface (e.g., the signals OTG and/or SERIAL) between the circuit 102 and the circuit 104.

Figure 2:
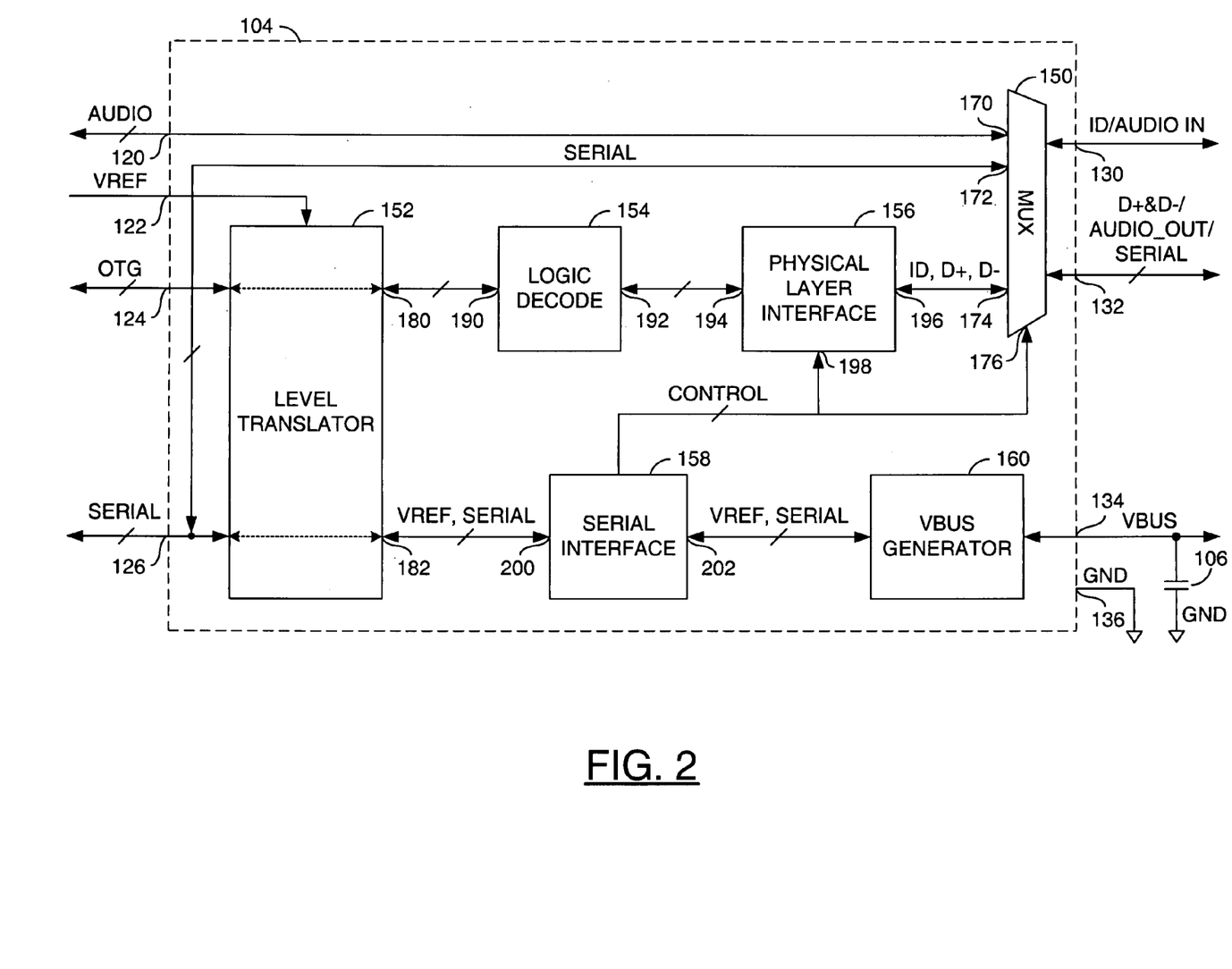
FIG. 2 is a detailed block diagram of the transceiver circuit of FIG. 1.

Referring to FIG. 2, a detailed block diagram of the circuit 104 is shown. The circuit 104 generally comprises a circuit (or device) 150, a circuit 152, a circuit 154, a circuit 156, a circuit 158, and a circuit 160. The circuit (or device) 150 may be implemented as a multiplexer circuit. The circuit 152 may be implemented as a level translator circuit. The circuit 154 may be implemented as a logic decoder circuit. The circuit 156 may be implemented as a physical layer interface (PHY) circuit. The circuit 156 generally includes a number of pull-up and pull-down circuits (or devices) (not shown). The circuit 158 may be implemented as a serial interface circuit. The circuit 160 may be implemented as a generator circuit. The circuit 160 is generally implemented as a VBus generator (e.g., a circuit configured to generate the signal VBUS).

The circuit 150 may have an input/output 170 that may receive/present the signal AUDIO, an input/output 172 that may receive/present the signal SERIAL, an input/output 174 that may receive/present the signals ID, D+, and D−, an input/output that may receive/present the signal AUDIO_IN and the signal ID, an input/output that may receive/present the signals D+, D−, the signal AUDIO_OUT, and the signal SERIAL, and a control input 176 that may receive a signal (e.g., CONTROL). The signal CONTROL may be implemented as an analog or digital control signal. In one example, the signal CONTROL may be implemented as a multi-bit digital control signal. In another example, the signal CONTROL may be implemented as a single-bit digital control signal. However, the signal CONTROL may be implemented as any appropriate control signal to meet the design criteria of a particular application. The signal CONTROL may be configured to control which group of signals are received/presented by the I/Os 130, 132, and/or 134 in response to the mode of operation of the circuit 100.

The circuit 150 may be configured to receive/present either (i) the signals ID, D+ and D−, (ii) the signals AUDIO_IN and AUDIO_OUT, or (iii) the signal SERIAL in response to the control signal CONTROL and the signals AUDIO, ID, D+, D−, and SERIAL. The circuit 150 may be configured to couple (i) the signals AUDIO_IN and AUDIO_OUT to the I/Os 130 and/or 132 when the circuit 100 is in a first mode of operation (e.g., when the I/Os 130, 132 and/or 134 are in a first state), (ii) the signals ID, D+, and D− to the I/Os 130 and/or 132 when the circuit 100 is in a second mode of operation (e.g., when the I/Os 130, 132 and/or 134 are in a second state), and (iii) the signal SERIAL to the I/O 132 when the circuit 100 is in a third mode of operation (e.g., when the bus I/Os 130, 132, and/or 134 are in a third state).

The first state of the I/Os 130 and/or 132 generally corresponds to the mode of operation where the interconnection formed between the circuit 100 and an external device (not shown) is an analog (e.g., audio) interconnection. The second state of the I/Os 130, 132 and/or 134 generally corresponds to the mode of operation where the interconnection formed between the circuit 100 and the external device is a USB (or USB OTG) interconnection. The third state of the bus I/Os 130, 132, and/or 134 generally corresponds to the mode of operation where the interconnection formed between the circuit 100 and the external device is a non-USB or USB OTG digital connection (e.g., an I²C or SPI interconnection).

The circuit 152 may have an input that may receive the signal VREF, an input/output that may receive/present the signal OTG, an input/output that may receive/present the signal SERIAL, an input/output 180 that may be coupled to the circuit 154, and an input/output 182 that may present the signals VREF and SERIAL to the circuit 158. The circuit 152 may be configured to translate and/or shift levels of the signals VREF, OTG, SERIAL, ID, D+, etc. The circuit 152 may also be configured to direct the signals OTG and SERIAL to/from the circuits 154 and/or 158.

The circuit 154 may be have an input/output 190 that may be coupled to the input/output 180 of the circuit 152 and an input/output 192 that may be coupled to the circuit 156. The circuit 154 may be configured to code/decode the signals OTG, ID, D+, etc. The circuit 156 may have an input/output 194 that may be coupled to the input/output 192 of the circuit 154, an input/output 196 that may receive/present the signals ID, D+, and D− to/from the circuit 150, and an input 198 that may receive the signal CONTROL. The circuit 156 may be configured as an internal interface between the device where the circuit 100 is implemented (e.g., a cellular telephone handset, not shown) and the external device that the circuit 100 is mounted to (e.g., a car kit, not shown). In an alternative example (not shown), the circuit 156 may be configured to switch pins that correspond to the signals D+ and D− into a high impedance state and the multiplexing function performed via the circuit 150 may be implemented via 5 analog switches corresponding to each of the audio connections to the I/Os 130 and/or 132.

The circuit 158 may have an input/output 200 that may be coupled to the input/output 182 of the circuit 152, an input/output 202 that may be coupled to the circuit 160, and an output that may present the signal CONTROL. The circuit 158 may be configured to present the signal CONTROL in response to the state of the I/Os 126, 130, 132, and/or 134. The circuit 160 may have an input/output that may be coupled to the input/output 202 of the circuit 158 and an input/output that may receive/present the signal VBUS. The circuit 160 may be configured to generate the signal VBUS in response to the signals VREF, SERIAL, etc.

Figure 3:
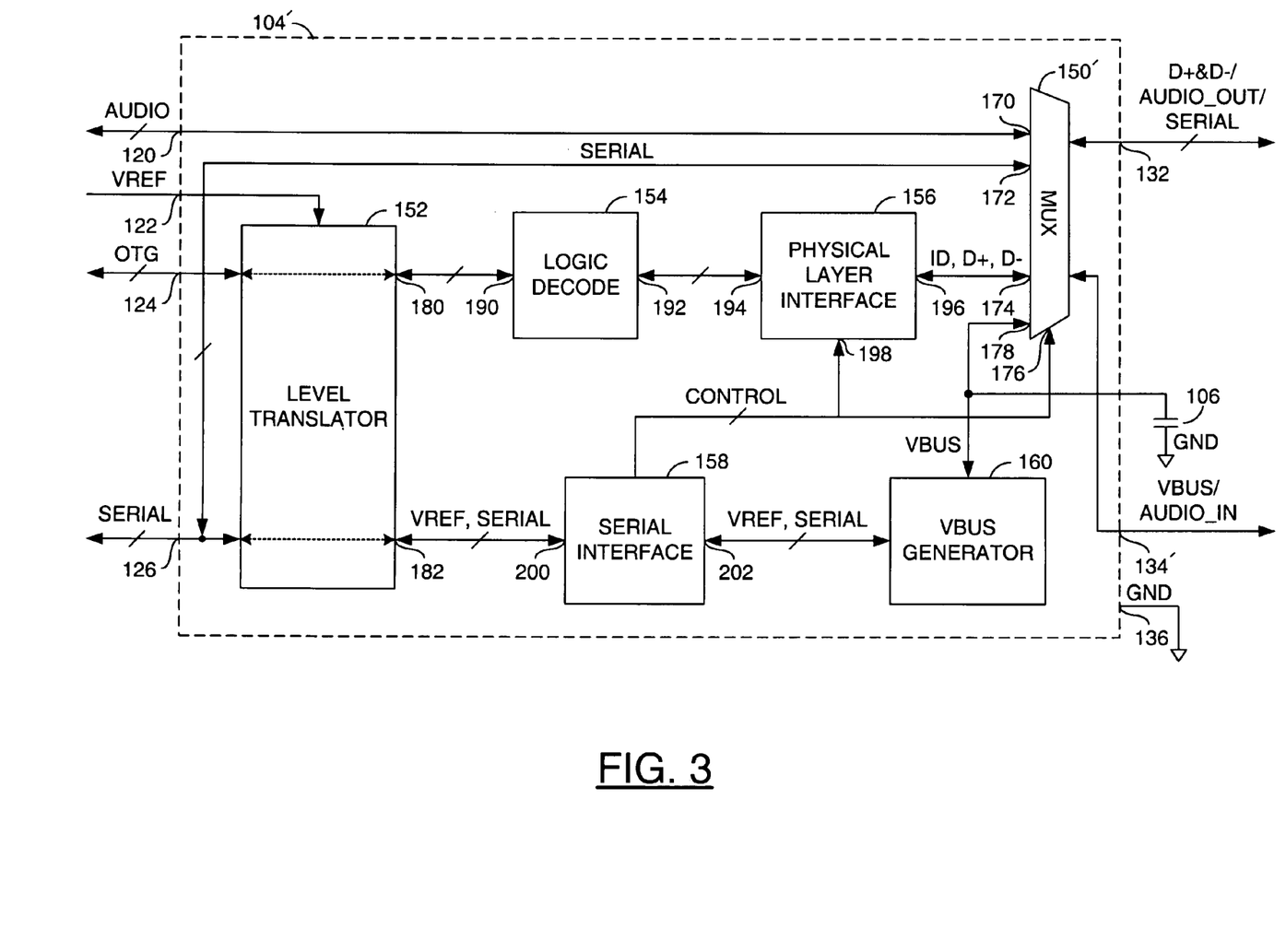
FIG. 3 is a detailed block diagram of another example transceiver circuit of FIG. 1.

Referring to FIG. 3, a block diagram illustrating a circuit 104' is shown. The circuit 104' may be implemented similarly to the circuit 104. The circuit 104' generally comprises a circuit 150'. The circuit 150' may be implemented similarly to the circuit 150. The circuit 104' may be implemented (i) without the bus I/O 130 and the signal ID and (ii) with a bus I/O 134'. The bus I/Os 132, 134', and 136 may be implemented as a 4-conductor/pin/pad interconnect. The circuit 104' may be implemented as a USB transceiver circuit. The bus I/O 134' may be configured to receive/present the signals VBUS and AUDIO_IN. The circuit 150' may have an input 178 that may receive the signal VBUS and an output that may present (i) the signals VBUS and AUDIO_IN. The circuit 106 may have the first terminal coupled to the input 178. The circuit 150' may be configured to present (i) the signal AUDIO_IN via the I/O 134' during the first mode of operation of the circuit 100 and (ii) the signal VBUS via the I/O 134' during the second mode of operation in response to the signal CONTROL.

Figure 4:
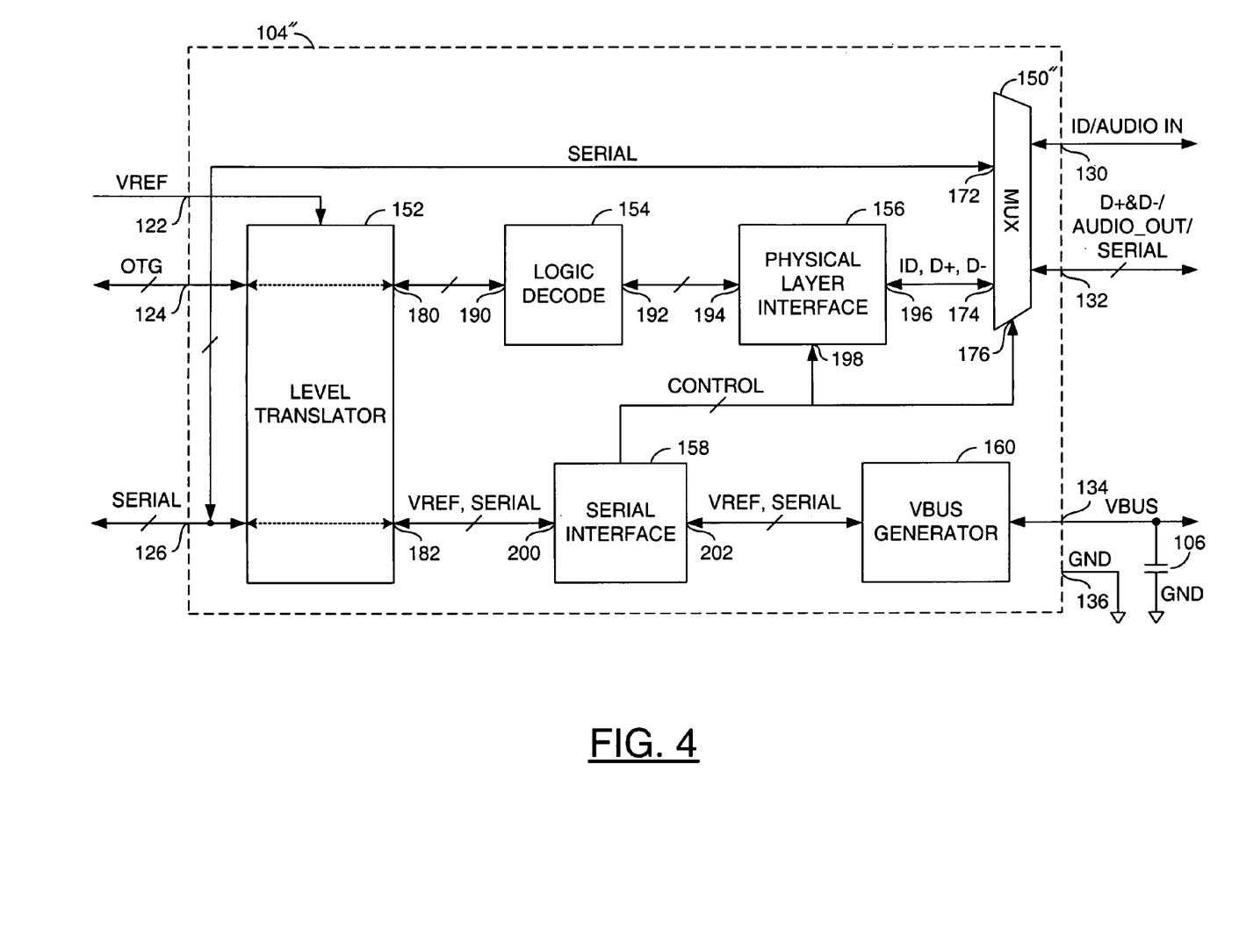
FIG. 4 is a detailed block diagram of another example transceiver circuit of FIG. 1.

Referring to FIG. 4, a block diagram illustrating a circuit 104" is shown. The circuit 104" may be implemented similarly to the circuit 104. The circuit 104" generally comprises a circuit 150". The circuit 150" may be implemented similarly to the circuit 150. The circuit 104" may be configured without the input/output 120. The circuit 150 may be configured without the input/output 170. The circuit 104" may be implemented as a USB (or USB OTG) transceiver circuit. In one example (not shown), the signal AUDIO may be capacitively coupled to the I/Os 130 and/or 132 during the first mode of operation. However, the signal AUDIO may be coupled to the I/Os 130 and 132 via any appropriate method and/or architecture to meet the design criteria of a particular application.

Figure 5:
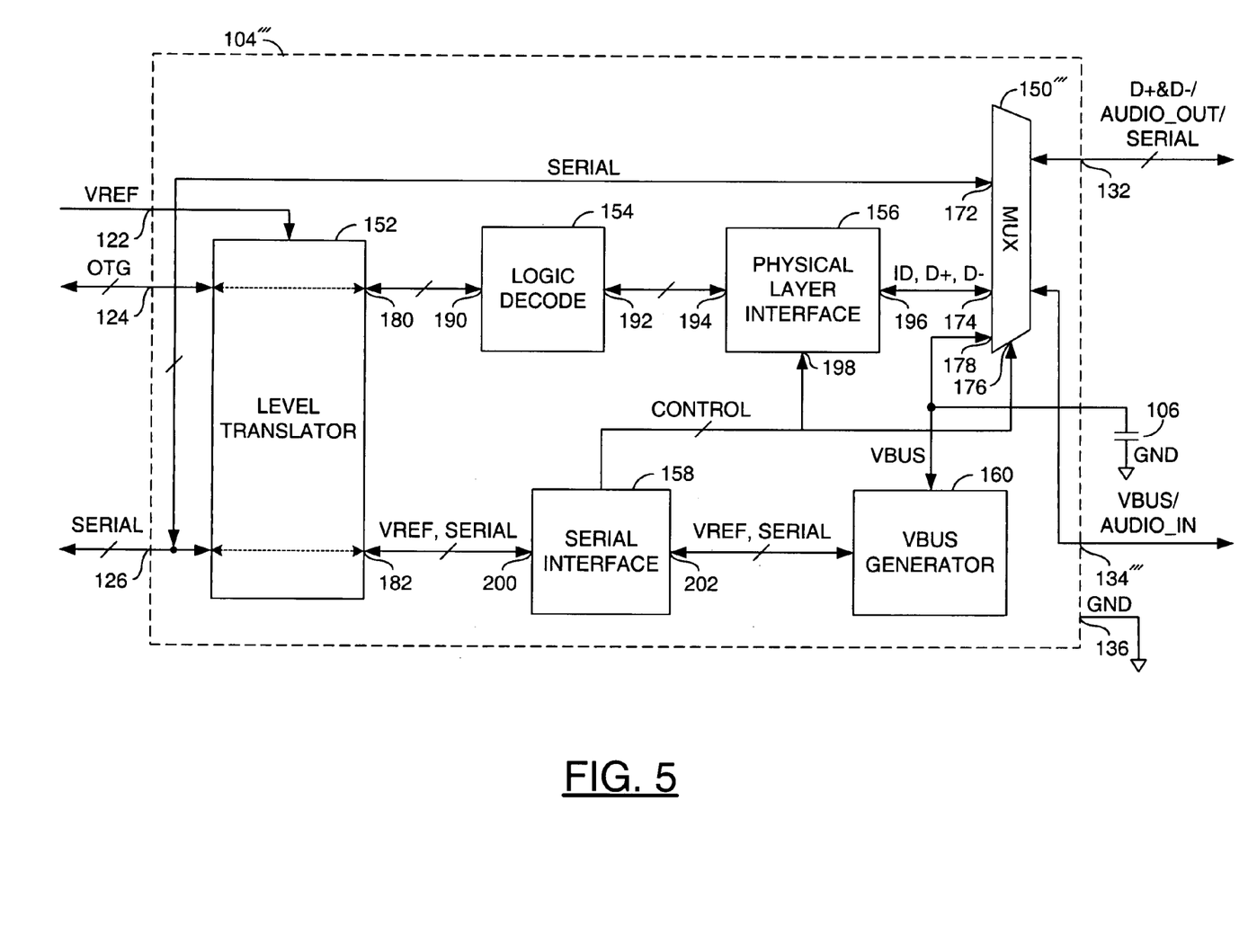
FIG. 5 is a detailed block diagram of another example transceiver circuit of FIG. 1.

Referring to FIG. 5, a block diagram illustrating a circuit 104''' is shown. The circuit 104''' may be implemented similarly to the circuit 104. The circuit 104''' generally comprises a circuit 150'''. The circuit 150''' may be implemented similarly to the circuit 150'. The circuit 104''' may be implemented as a USB transceiver circuit.

The circuit 104''' may be implemented (i) without the input/output 120, the bus I/O 130, and the signal ID and (ii) with a bus I/O 134'''. The bus I/O 134''' may be implemented similarly to the bus I/O 134'. The circuit 104''' may be configured to operate similarly to the circuit 104".

The present invention may be implemented as a USB transceiver integrated circuit that incorporates both USB (or USB OTG) and audio connections to the handset functionality via a single USB/audio "external" interface (e.g., the circuit 150) from the transceiver to the connector pins on the handset. The transceiver IC 104 may internally multiplex the audio signal (e.g., the signal AUDIO/AUDIO_IN/AUDIO_OUT), USB (or USB OTG) signals (e.g., the signals D+, D−, and/or ID), or non-USB (or USB OTG) digital signals (e.g., the signal SERIAL) onto the external interface (e.g., the I/Os 130, 132, and/or 134) in accordance with the appropriate state of the connection.

Most currently available cellphones with USB capability incorporate the digital portions of the USB interface within a baseband processor circuit. However, the analog portions of the USB interface (essentially the physical layer interface, PHY) are generally implemented externally in a separate USB transceiver IC. The most common conventional interface connection between the transceiver and the digital IC is a 5 or 6 wire interface. Previous efforts to develop an alternative standard interface connection that requires fewer pins have not been successful and/or have a number of disadvantages described in the background section. The OTG supplement to the USB specification may require additional analog functionality within the transceiver. The additional analog functionality will generally be controlled by the digital IC via a serial interface that incorporates a serial bus protocol such as I²C or SPI.

The present invention may be implemented as a transceiver IC with an additional audio interface that incorporates connections to the audio subsystem of the handset that may be connected to the earpiece jack connector within the cellphone. In one example, the ASIC 102 may be configured to select whether the USB (or USB OTG) connections (e.g., the bus I/Os 130, 132, and/or 134) are implemented for (i) USB, (ii) non-USB digital, or (iii) audio via commands sent over the serial interface (e.g., via the signals OTG and/or SERIAL). In another example, the transceiver IC 104 may be configured to select whether the USB (or USB OTG) connections are to be implemented for USB, non-USB digital, or audio signals via commands sent over the serial interface. The selection of whether the USB (or USB OTG) connections are to be implemented for USB, non-USB digital, or audio signals is generally performed in response to the state that is detected (or determined) at the USB (or USB OTG) connections (e.g., the bus I/Os 130, 132, and/or 134).

The present invention may have a number of advantages over conventional cellphone handset to car kit interfacing. The present invention may (i) be implemented without additional cellphone handset and car kit connector pads/pins, (ii) implement standard connectors and protocols rather than proprietary connectors, (iii) be implemented without a separate headset jack connection, (iv) make all connections automatically and simultaneously without additional user intervention when the handset is mounted in the car kit "nest", (v) reduce parasitics and ensure better electrical properties for the analog and digital signals, (vi) be implemented without analog audio switching elsewhere within the device, (vii) directly connect the signals from the audio pins of the transceiver to the headset jack, (viii) significantly reduce cost and save space within the device, (ix) multiplex within the device such that the analog signals do not have to be "tri-stated", (x) be implemented without connection of any external components to the sensitive USB D+ and D− signal conductors, and/or (xi) support High Speed (HS) USB (e.g., 480 Mb/s) on the USB connection where the characteristics of the D+ and D− signal conductors are generally very tightly controlled.

While the present invention has been generally described in the context of the USB OTG protocol, the present invention may also be applicable to traditional USB applications. The USB OTG protocol generally provides for the ID signal connection (e.g., the bus I/O 130) in addition to the standard USB signal connections (e.g., the bus I/Os 132 and 134 and the ground output 136).

In another example of the present invention (not shown), the transceiver circuit 104 may be configured to provide audio buffering and/or amplification in addition to switching (or multiplexing) the audio signals and the digital signals. In yet another example of the present invention (not shown), the transceiver circuit 104 may be configured to provide audio analog-to-digital-converters (ADCs) and digital-to-analog-converters (DACs). The circuit 104 may be configured to receive/present digital audio signals from the baseband processor circuit 102 over a serial interface (e.g., via the signals OTG and/or SERIAL) or via a separate dedicated digital audio interface (not shown).

In yet another example of the present invention (not shown), the audio interface (e.g., the I/O 120) may be configured to support digital communications signals different from the USB OTG protocol signals (e.g., digital signals that are compliant to the RS232 standard and at digital logic levels) via the same connections as the USB OTG signals (e.g., the USB OTG ID signal I/O 130, D+ and D− signal I/Os 132, and the VBus signal I/O 134). When the present invention is configured to support digital communications signals different from the USB OTG protocol signals, the present invention may be compatible with older accessories (or devices) (not shown) that do not incorporate USB functionality. The present invention may be configured to support such applications via (i) an implementation that comprises connecting the audio interface to a universal asynchronous receiver/transmitter (UART) (not shown) in the baseband circuit 102 or (ii) providing an additional dedicated interface (not shown) to the serial interface circuit 158 and providing further switching/multiplexing circuits (not shown) within the transceiver circuit 104.

In one example, the present invention may be implemented as an IC having a USB OTG physical layer interface that provides the capability of multiplexing (i) analog audio signals and/or (ii) digital signals other than USB OTG signals on the USB OTG signal pins. In another example, the present invention may be implemented as a USB transceiver IC within a circuit (not shown) that provides the capability of multiplexing (i) analog audio signals and/or (ii) digital signals other than USB OTG signals on the USB OTG signal pins.

The present invention may provide a number of advantages over conventional, technically inferior solutions. The present invention may provide the capability to multiplex analog audio signals with USB OTG signals to the USB OTG transceiver. In one example, the transceiver may detect a connection to a car kit and automatically switch to an audio interconnect. In another example, an ASIC may be configured to detect the connection to the car kit and automatically switch to an audio interconnect.

The present invention may be implemented as a USB and/or USB OTG physical layer interface, transceiver IC, line driver, and/or receiver circuit. The present invention may be implemented as a circuit configured to transmit and/or receive audio signals on the USB or USB OTG signaling connections. The present invention may be configured to detect an externally applied state of one or more of the USB (or USB OTG) connections and directly couple the appropriate signals (e.g., audio, USB, USB OTG, etc.) to the USB (or USB OTG) connections in response to the detected state.

While the invention has been particularly shown and described with reference to the preferred embodiments thereof, it will be understood by those skilled in the art that various changes in form and details may be made without departing from the spirit and scope of the invention.

What is claimed is:

1. An apparatus comprising:
    a transceiver circuit comprising a multiplexer circuit, an interface circuit, a physical layer interface and a plurality of bus input/outputs (I/Os), wherein (a) said transceiver circuit is configured to directly couple (i) an analog input signal to said bus I/Os with said multiplexer circuit when said bus I/Os are in a first state and (ii) a plurality of first digital signals to said bus I/Os with said multiplexer circuit when said bus I/Os are in a second state, (b) said multiplexer circuit is configured to present/receive (i) an analog output signal on an input/output when in said first state and (ii) said plurality of first digital signals on said input/output when in said second state, and (c) said interface circuit is configured to present a control signal to said multiplexer circuit and said physical layer interface to control coupling in response to said first state and said second state.

2. The apparatus according to claim 1, wherein said transceiver circuit is further configured to directly couple a plurality of second digital signals to said bus I/Os with said multiplexer circuit when said bus I/Os are in a third state, wherein said multiplexer circuit is configured to (i) present/receive said plurality of second digital signals on said input/output when in said third state and (ii) provide for the sharing of said analog output signal, said first digital signals and said second digital signals on said input/output.

3. The apparatus according to claim 2, wherein said apparatus further comprises a second circuit (i) coupled to said transceiver circuit and (ii) configured to present/receive said first and second digital signals.

4. The apparatus according to claim 3, wherein:
    said analog input signal comprises an audio input signal;
    said analog output signal comprises an audio output signal;
    said transceiver circuit comprises a cellular telephone transceiver circuit;
    said second circuit comprises a cellular telephone application specific integrated circuit (ASIC); and
    said bus I/Os comprise a cellular telephone interconnect.

5. The apparatus according to claim 3, wherein said transceiver circuit is configured to determine said first state, said second state, or said third state of said bus I/Os.

6. The apparatus according to claim 3, wherein said second circuit is configured to determine said first state, said second state, or said third state of said bus I/Os.

7. The apparatus according to claim 3, wherein said apparatus is configured to communicate said first, second, and third states between said transceiver circuit and said second circuit via one or more of said plurality of second digital signals.

8. The apparatus according to claim 3, wherein said second circuit comprises a broadband processor circuit.

9. The apparatus according to claim 2, wherein said second digital signals are signals selected from a group consisting of Inter-IC ($I^2C$) protocol and Serial Peripheral Interface (SPI) protocol signals.

10. The apparatus according to claim 2, wherein said interface circuit is configured to present said control signal to said physical layer interface and said multiplexer circuit to control said coupling in response to said first, second, and third states.

11. The apparatus according to claim 10, wherein said multiplexer circuit presents/receives one of (i) said analog output signal, (ii) said first digital signals and (iii) said second digital signals in response to said control signal.

12. The apparatus according to claim 1, wherein (i) said bus I/Os and (ii) said first digital signals are compliant with a Universal Serial Bus On-The-Go (USB OTG) protocol.

13. The apparatus according to claim 1, wherein said first digital signals comprise signals compliant to a Universal Serial Bus (USB) protocol.

14. An apparatus for alternately presenting/receiving an analog input signal or a plurality of digital signals via a plurality of transceiver bus input/outputs (I/Os) comprising:
    means for determining a state of said bus inputs/outputs;

means for directly coupling said analog input signal to said bus inputs/outputs with a multiplexer circuit when said bus inputs/outputs are in a first state;

means for directly coupling said plurality of digital signals with said multiplexer circuit to said bus inputs/outputs when said bus inputs/outputs are in a second state, wherein said multiplexer circuit is configured to present/receive (i) an analog output signal on an input/output when in said first state and (ii) said plurality of digital signals on said input/output when in said second state; and means for presenting a control signal to a physical layer interface and said multiplexer circuit to control coupling in response to said first state and said second state.

15. A method for alternately presenting/receiving an analog input signal or a plurality of first digital signals via a plurality of transceiver bus input/outputs (I/Os) comprising the steps of:

(A) determining a state of said bus inputs/outputs;

(B) directly coupling said analog input signal to said bus inputs/outputs with a multiplexer circuit when said bus inputs/outputs are in a first state;

(C) directly coupling said plurality of first digital signals to said bus inputs/outputs with said multiplexer circuit when said bus inputs/outputs are in a second state, wherein said multiplexer circuit is configured to present/receive (i) an analog output signal on an input/output when in said first state and (ii) said plurality of first digital signals on said input/output when in said second state; and (D) presenting a control signal to a physical layer interface and said multiplexer circuit to control coupling in response to said first state and said second state.

16. The method according to claim 15, wherein said method further comprises the step of:

directly coupling a plurality of second digital signals to said bus inputs/outputs when said bus inputs/outputs are in a third state, wherein said multiplexer circuit is configured to (i) present/receive said plurality of second digital signals on said input/output when in said third state and (ii) provide for the sharing of said analog output signal, said first digital signals and said second digital signals on said input/output.

17. The method according to claim 16, wherein step (A) comprises determining said state of said bus inputs/outputs via a cellular telephone transceiver circuit.

18. The method according to claim 17, wherein step (A) comprises determining said state of said bus inputs/outputs via a cellular telephone application specific integrated circuit (ASIC).

19. The method according to claim 18, wherein said method further comprises the step of:

communicating said state between said transceiver circuit and said ASIC via said second digital signals.

20. The method according to claim 15, wherein (i) said analog input signal comprises an audio input signal (ii) said analog output signal comprises an audio output signal and (iii) said first digital signals comprise signals compliant to a Universal Serial Bus On-The-Go (USB OTG) standard.

* * * * *